(12) United States Patent
Yang et al.

(10) Patent No.: US 8,908,282 B2
(45) Date of Patent: Dec. 9, 2014

(54) PLASTIC OPTICAL LENS AND AN INJECTION-MOLDING METHOD FOR MANUFACTURING THE SAME

(75) Inventors: Sheng-Yu Yang, Taichung (TW); Wei-Hung Weng, Taichung (TW)

(73) Assignee: Largan Precision Co., Ltd., Taichung (TW)

( * ) Notice: Subject to any disclaimer, the term of this patent is extended or adjusted under 35 U.S.C. 154(b) by 279 days.

(21) Appl. No.: 13/472,834

(22) Filed: May 16, 2012

(65) Prior Publication Data

US 2013/0148208 A1 Jun. 13, 2013

(30) Foreign Application Priority Data

Dec. 12, 2011 (TW) .............................. 100145761 A

(51) Int. Cl.
*G02B 3/00* (2006.01)
(52) U.S. Cl.
CPC . *G02B 3/00* (2013.01); *Y10S 359/90* (2013.01)
USPC .......................................... 359/642; 359/900

(58) Field of Classification Search
USPC .......................................... 359/642, 796, 900
See application file for complete search history.

(56) References Cited

U.S. PATENT DOCUMENTS 4,839,110 A * 6/1989 Kingsbury ..................... 264/2.2

* cited by examiner

*Primary Examiner* — Jack Dinh
(74) *Attorney, Agent, or Firm* — Tim Tingkang Xia, Esq.; Morris, Manning & Martin, LLP

(57) ABSTRACT

This invention provides a plastic optical lens having a sprue gate plane. An average height of the portion defined by the width of the sprue gate plane is larger than at least one portion outside of a width of the sprue gate plane of any annular cross-section centering an optical axis between an optical effective diameter region and the sprue gate plane. The plastic optical lens is formed by an injection-molding method that employs a mold comprising an inlet channel arranged between the optical effective diameter region and the sprue gate plane. The inlet channel provides a shortcut that facilitates the molten plastics to flow to the optical effective diameter region as early as possible during the lens molding process, thereby avoiding the formation of a void or a welding line in the optical effective diameter region. Consequently, the production yield for the optical lens can be improved.

9 Claims, 35 Drawing Sheets

PLASTIC OPTICAL LENS AND AN INJECTION-MOLDING METHOD FOR MANUFACTURING THE SAME

CROSS-REFERENCE TO RELATED APPLICATIONS

This non-provisional application claims priority under 35 U.S.C. §119(a) on Patent Application No. 100145761 filed in Taiwan R.O.C on Dec. 12, 2011, the entire contents of which are hereby incorporated by reference.

BACKGROUND OF THE INVENTION

1. Field of the Invention

The present invention relates to a plastic optical lens and a molding method therefor, and more particularly, to a plastic optical lens having a surface with annular curves arranged in an area outside an optical effective diameter thereof and a molding method therefor.

2. Description of the Prior Art

With the development of portable devices, photographing lens assemblies are leaning toward a trend of being more compact. This requires the lens to have a smaller thickness and a shorter diameter. In the past, larger-size optical systems are provided with light-shielding sheets to filter out the flare/ghost. Such a shielding technique, however, is less applicable for a compact lens assembly. Therefore, a compact lens assembly may be provided with additional curved structures, e.g. a plurality of annular curves centering an optical axis, arranged in a region outside an optical effective diameter thereof to direct the unwanted light in the system to a place other than the image plane. In the conventional method, these curved structures are symmetrically disposed with respect to an optical axis. FIGS. 17A and 17B illustrate the flow of the molten plastics from the sprue gate (not shown) into the lens mold during the plastic lens molding process in which the conventional plastic injection-molding method is applied. As can be clearly seen from FIGS. 17A and 17B, the arrangement of these curved structures is one of the factors that hinder the flow of the molten plastics. As lenses now are made thinner, the resistance that hinders the flow of the molten plastics increases significantly. If the speed of the molten plastics flowing in a direction from the sprue gate toward a region of the lens mold corresponding to the center of the lens is not improved, molding defects, e.g. a void or a welding line shown in FIG. 17B, can be formed easily within the optical effective diameter region of the lens during the lens molding process. These defects not only reduce the production yield for the lens but also affect the optical performance of the lens.

SUMMARY OF THE INVENTION

An object of the present invention is to provide a plastic injection-molding method for an optical lens having a surface with annular curves in a region outside an optical effective diameter thereof. This method employs a mold comprising an inlet channel arranged between a region of the mold corresponding to an optical effective diameter region and a sprue gate. The arrangement of the inlet channel increases the cross-sectional area of the path between the sprue gate and the region of the mold corresponding to the optical effective diameter region and reduces the resistance that hinders the flow of the molten plastics through the inlet channel so that the molten plastics can pass through the region of the mold corresponding to the optical effective diameter region earlier than through the peripheral parts of the mold during the lens molding process, thereby avoiding the formation of a void or a welding line in the optical effective diameter region. Consequently, good image quality can be maintained, and the production yield for the lens can be increased.

With the aforementioned injection-molding method, this invention provides a plastic optical lens having a sprue gate plane. A height of at least one portion other than the portion defined within a width of the sprue gate plane of any annular cross-section centering an optical axis between an optical effective diameter region of the lens and the sprue gate plane is smaller than an average height of the portion defined by the width of the sprue gate plane.

DETAILED DESCRIPTION OF THE PREFERRED EMBODIMENTS

The present plastic optical lens and the injection-molding method therefor will be described by way of preferred embodiments and the accompanying drawings.

Figure 1A:
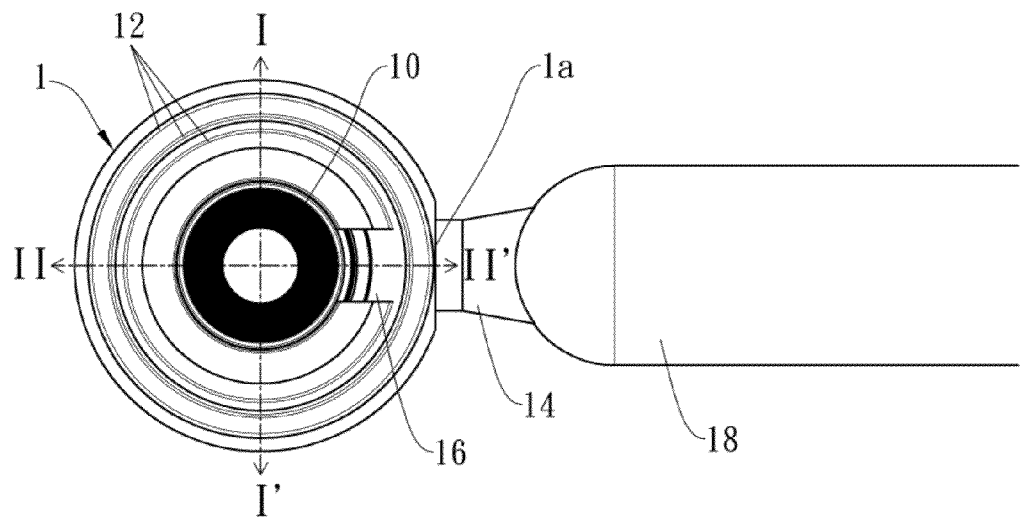
FIGS. 1A-1D illustrates a plastic optical lens in accordance with a first embodiment of the present invention.
Figure 1B:
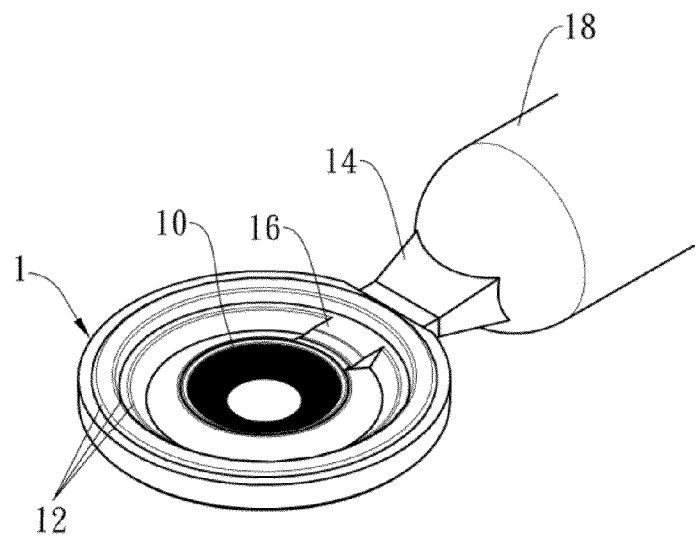
Figure 1C:
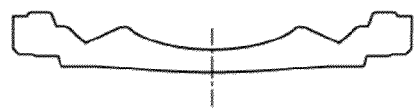
Figure 1D:
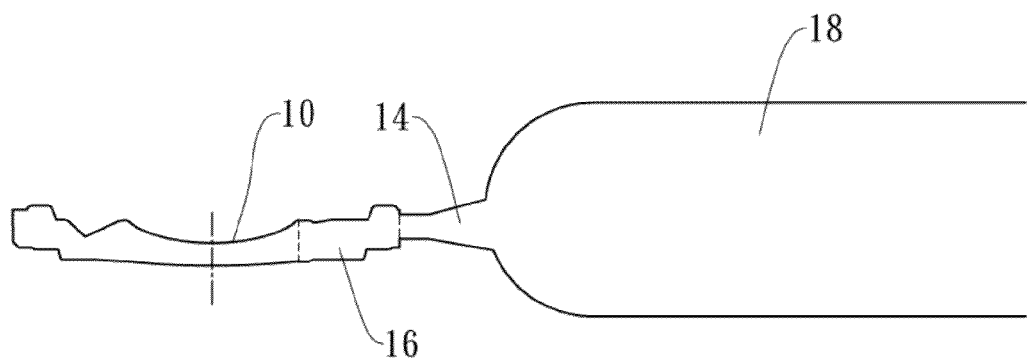
Figure 2A:
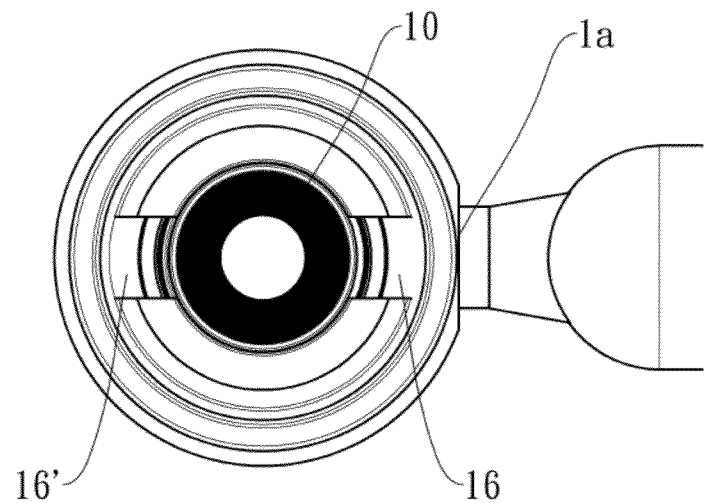
FIGS. 2A-2D illustrates alternative examples of the plastic optical lens in accordance with the first embodiment of the present invention.
Figure 2B:
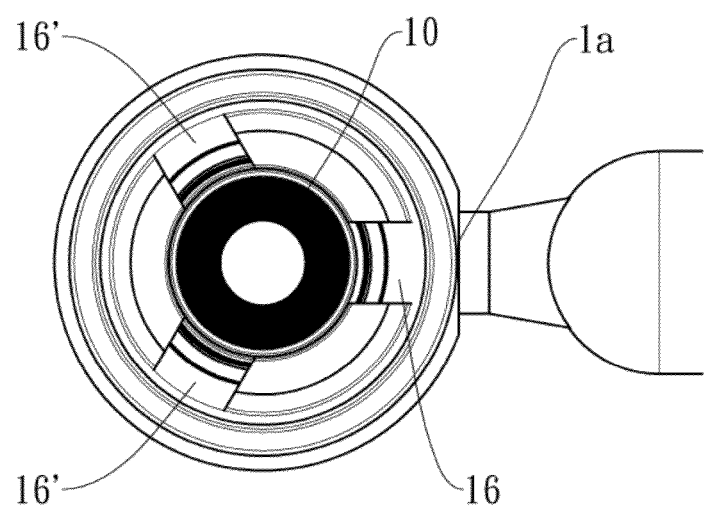
Figure 2C:
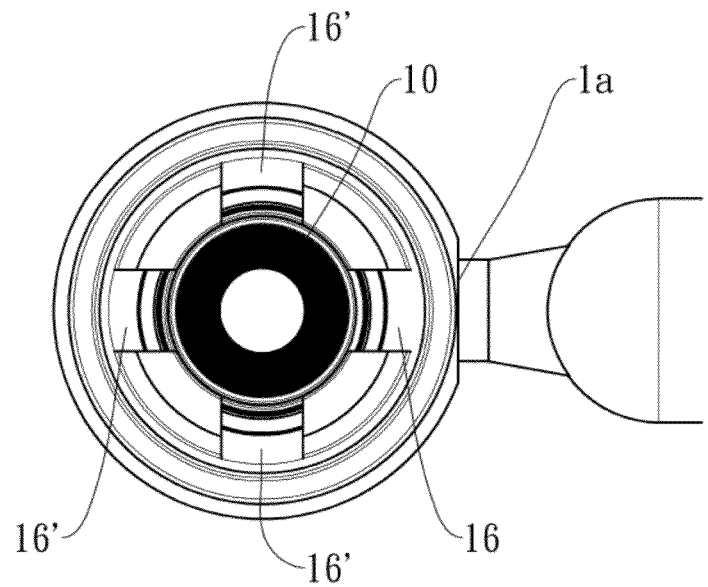
Figure 2D:
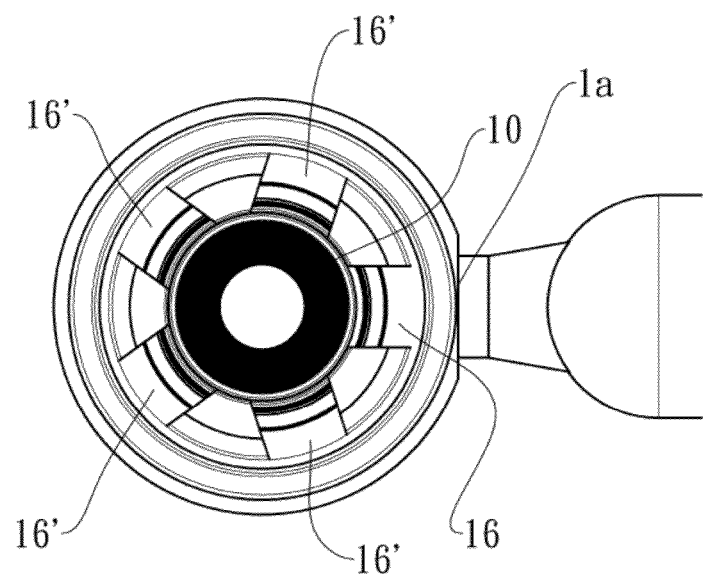
Figure 3A:
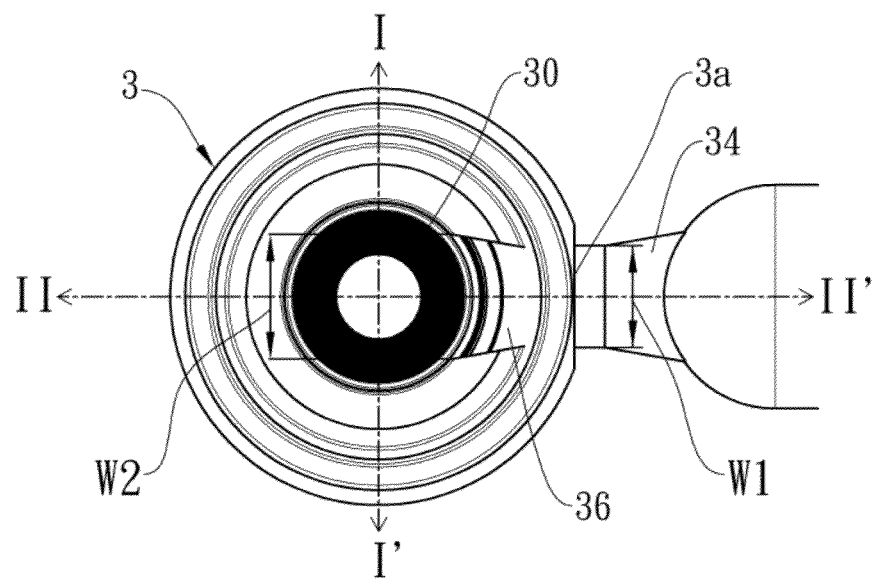
FIGS. 3A-3D illustrates a plastic optical lens in accordance with a second embodiment of the present invention.
Figure 3B:
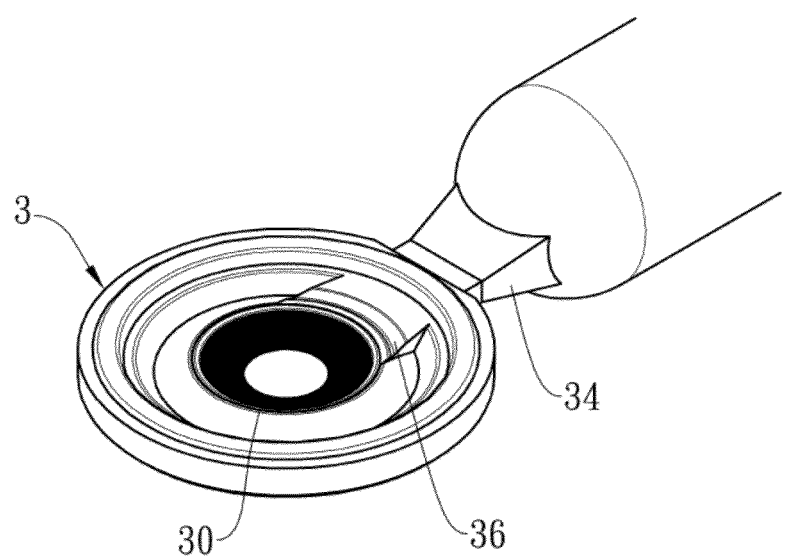
Figure 3C:
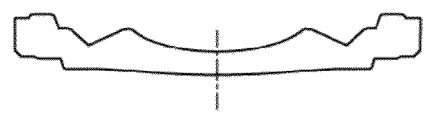
Figure 3D:
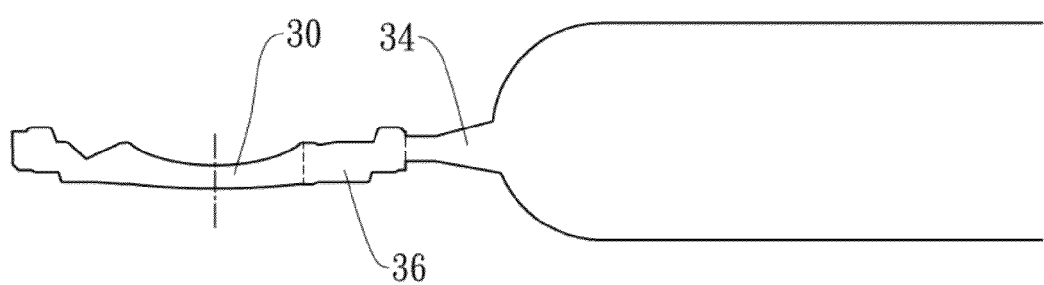
Figure 4A:
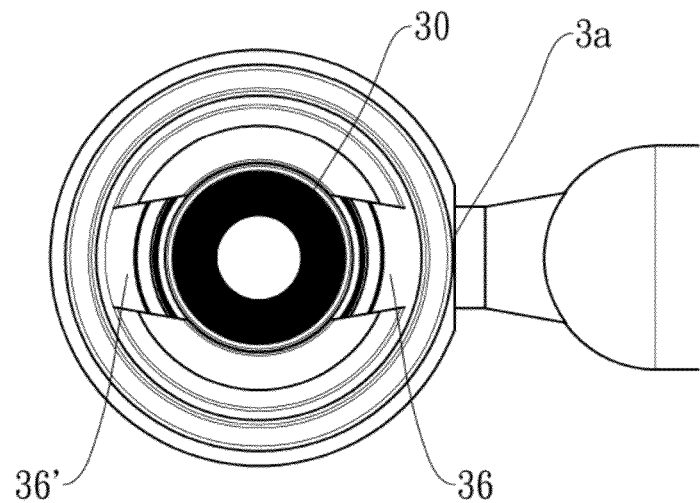
FIGS. 4A-4D illustrates alternative examples of the plastic optical lens in accordance with the second embodiment of the present invention.
Figure 4B:
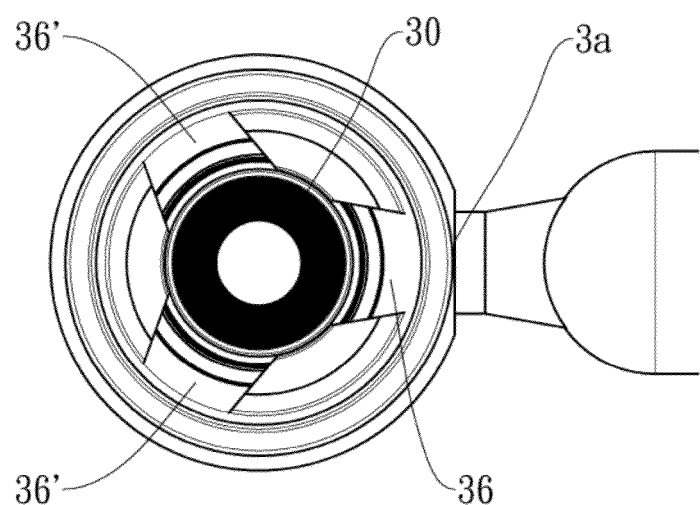
Figure 4C:
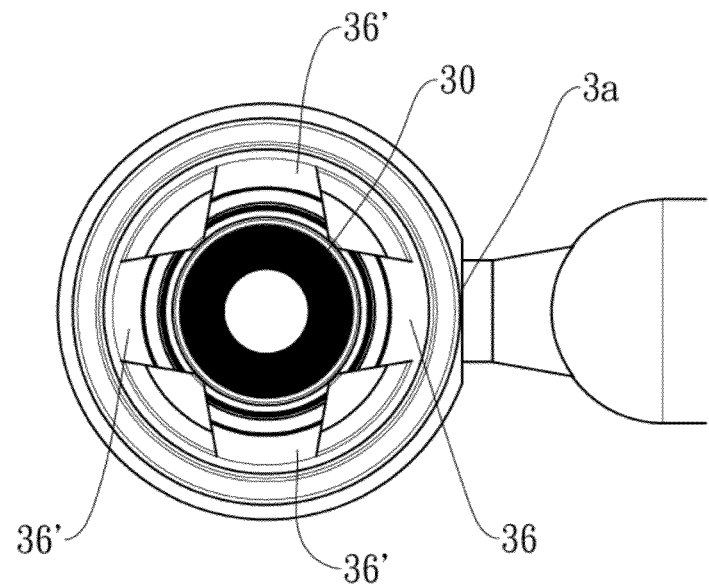
Figure 4D:
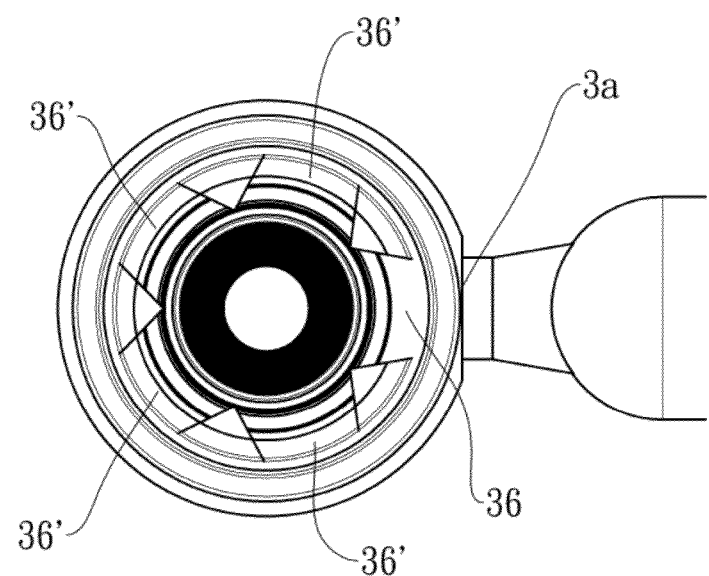
Figure 5A:
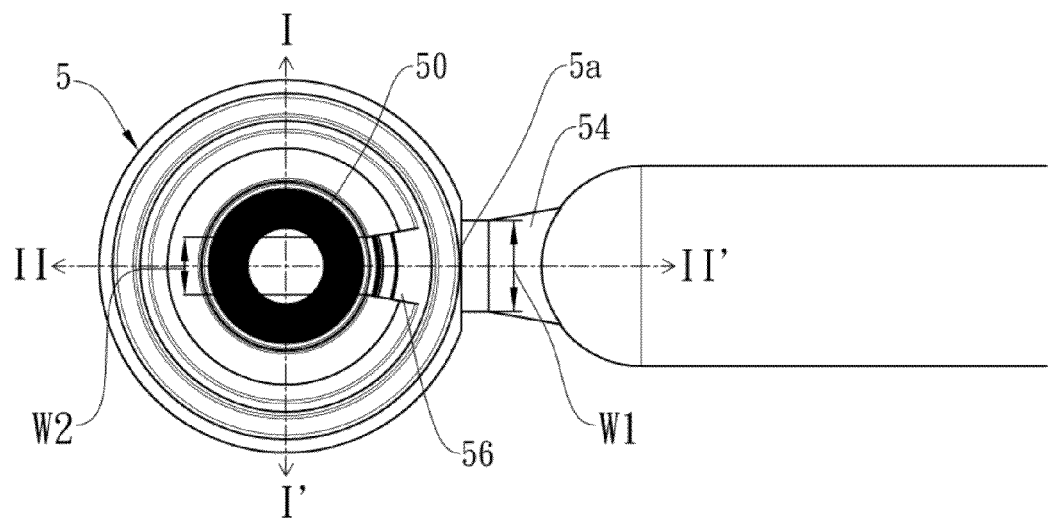
FIGS. 5A-5D illustrates a plastic optical lens in accordance with a third embodiment of the present invention.
Figure 5B:
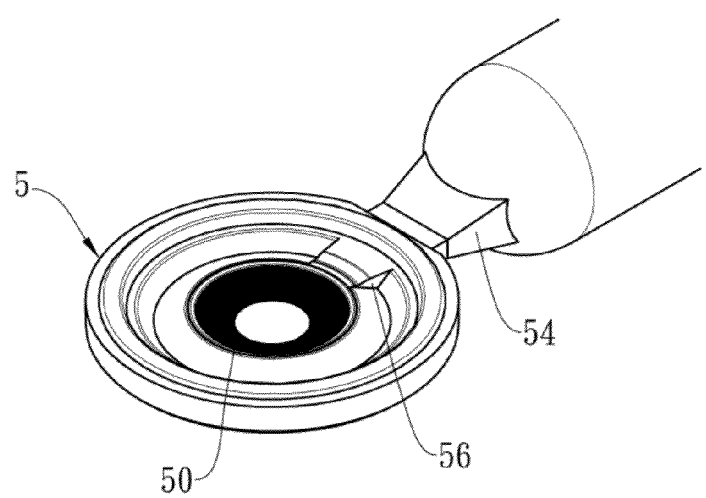
Figure 5C:
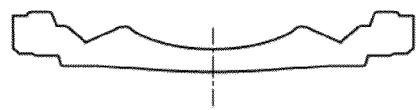
Figure 5D:
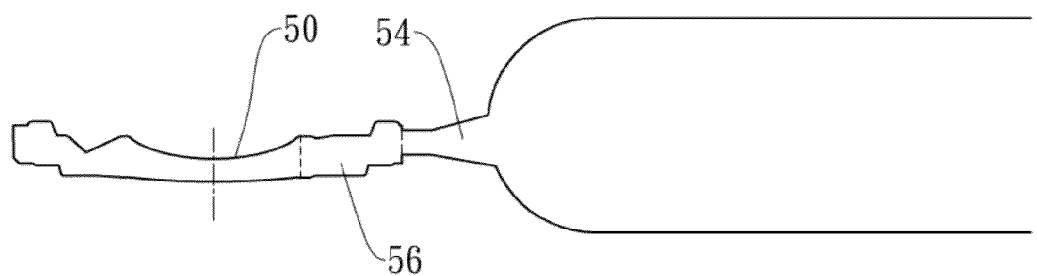
Figure 6A:
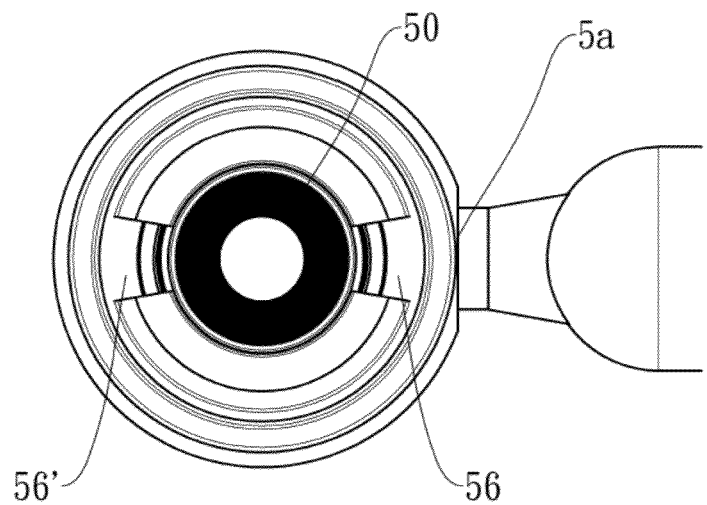
FIGS. 6A-6D illustrates alternative examples of the plastic optical lens in accordance with the third embodiment of the present invention.
Figure 6B:
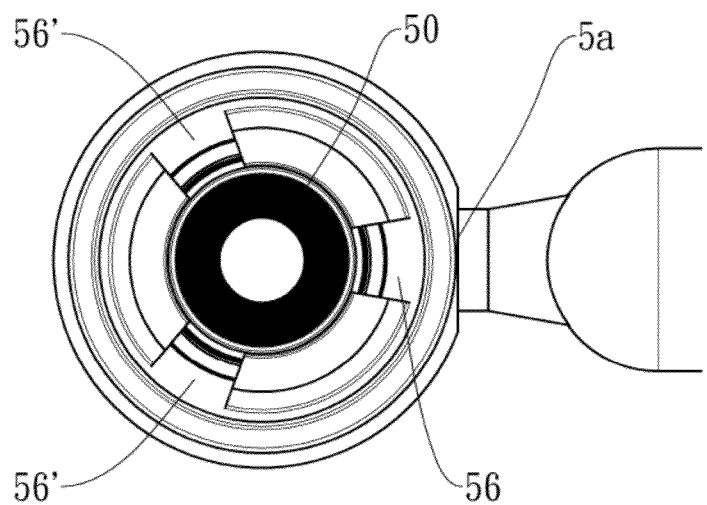
Figure 6C:
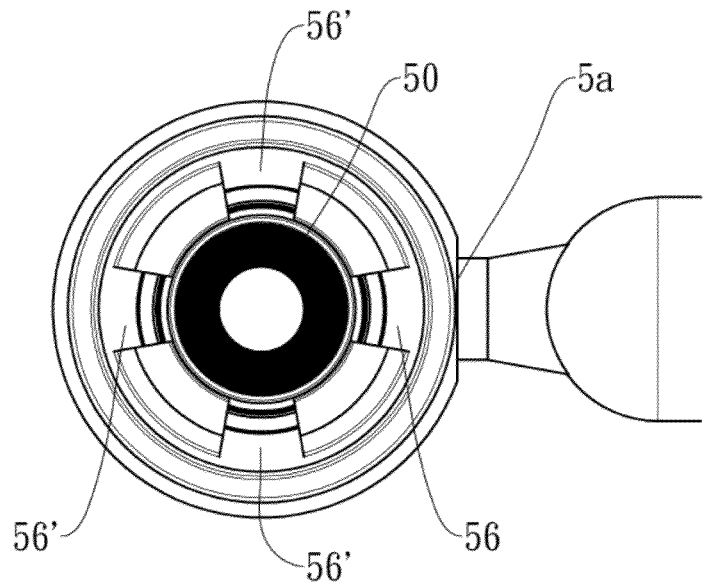
Figure 6D:
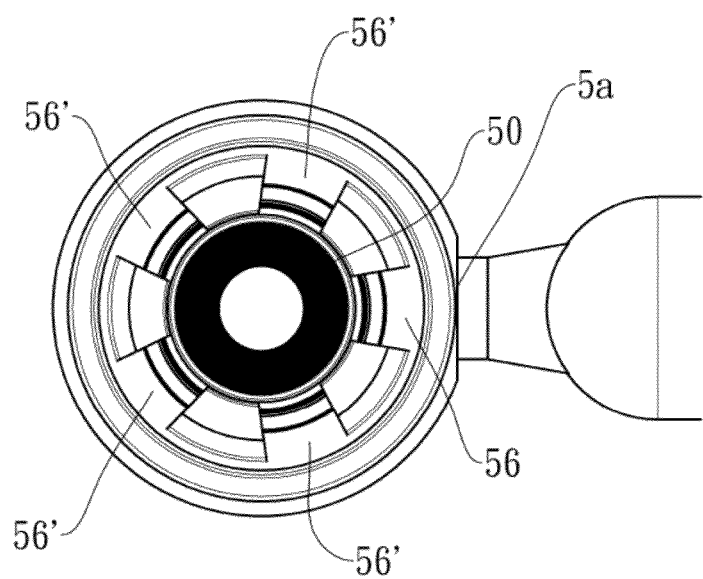
Figure 7A:
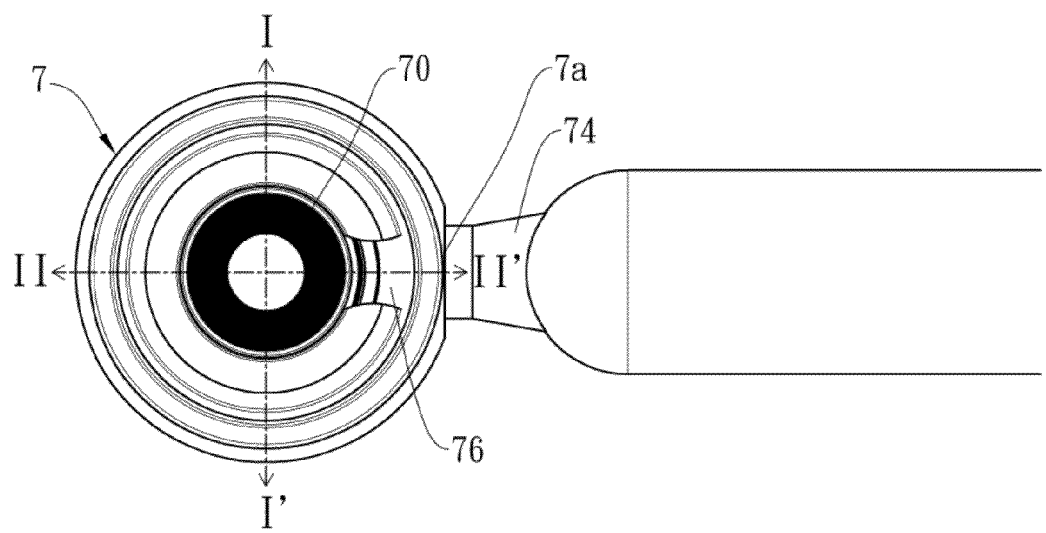
FIGS. 7A-7D illustrates a plastic optical lens in accordance with a fourth embodiment of the present invention.
Figure 7B:
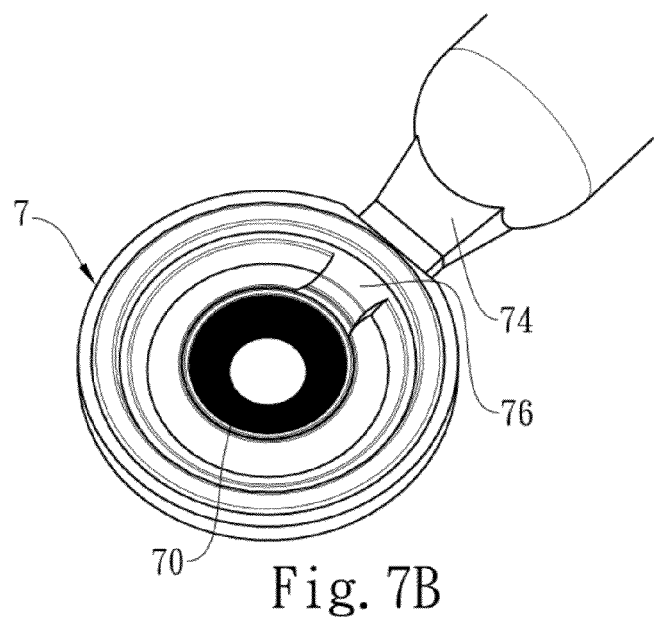
Figure 7C:
Figure 7D:
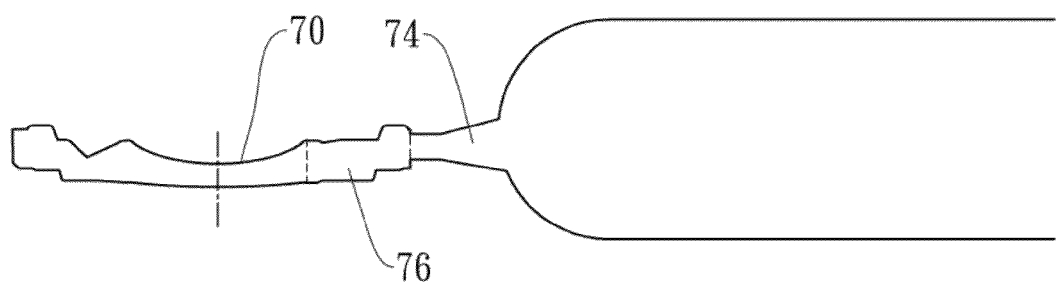
Figure 8A:
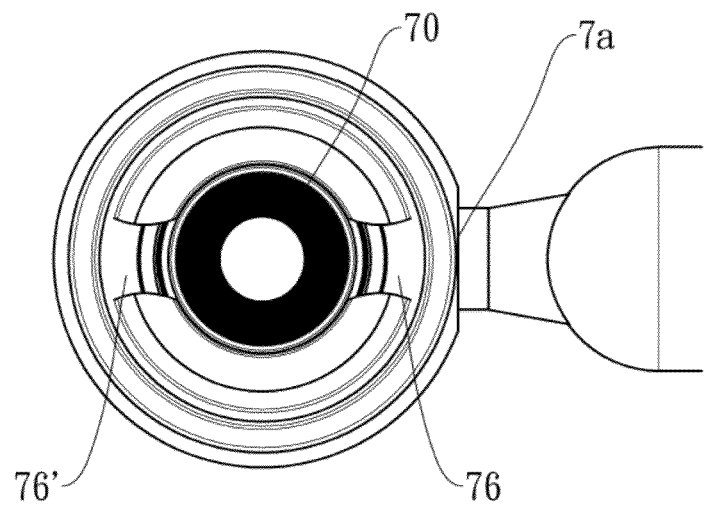
FIGS. 8A-8D illustrates alternative examples of the plastic optical lens in accordance with the fourth embodiment of the present invention.
Figure 8B:
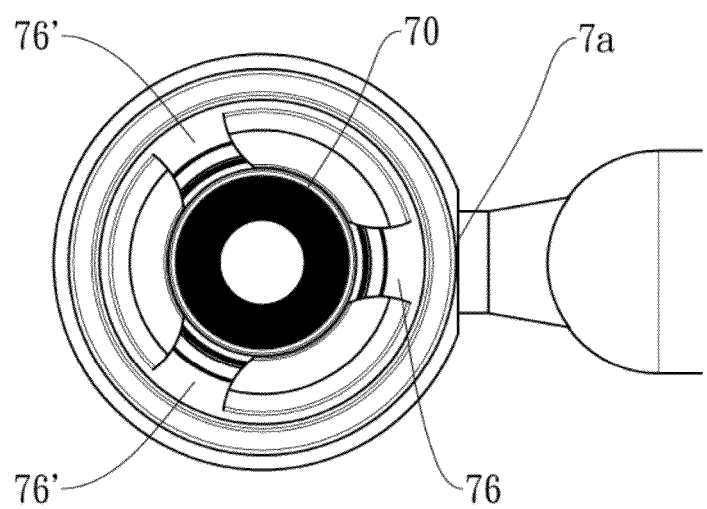
Figure 8C:
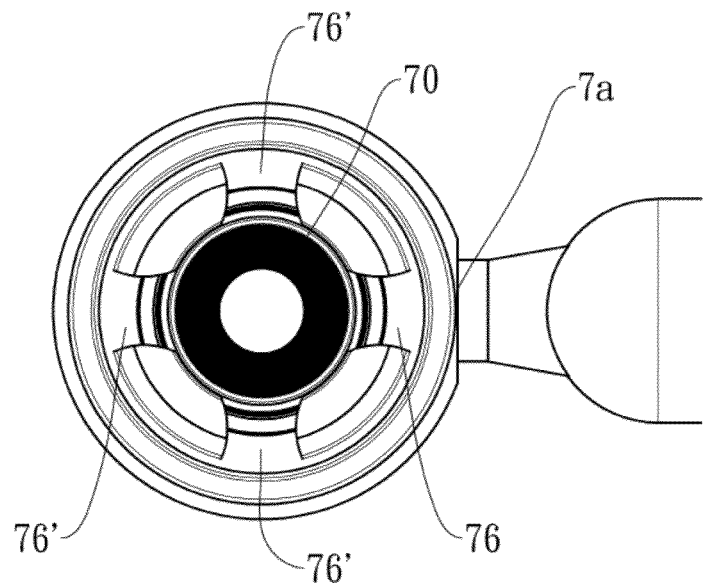
Figure 8D:
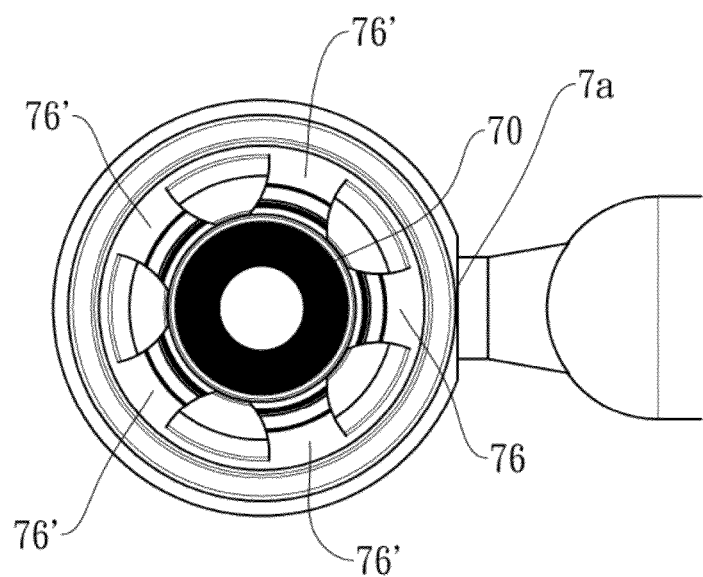
Figure 9A:
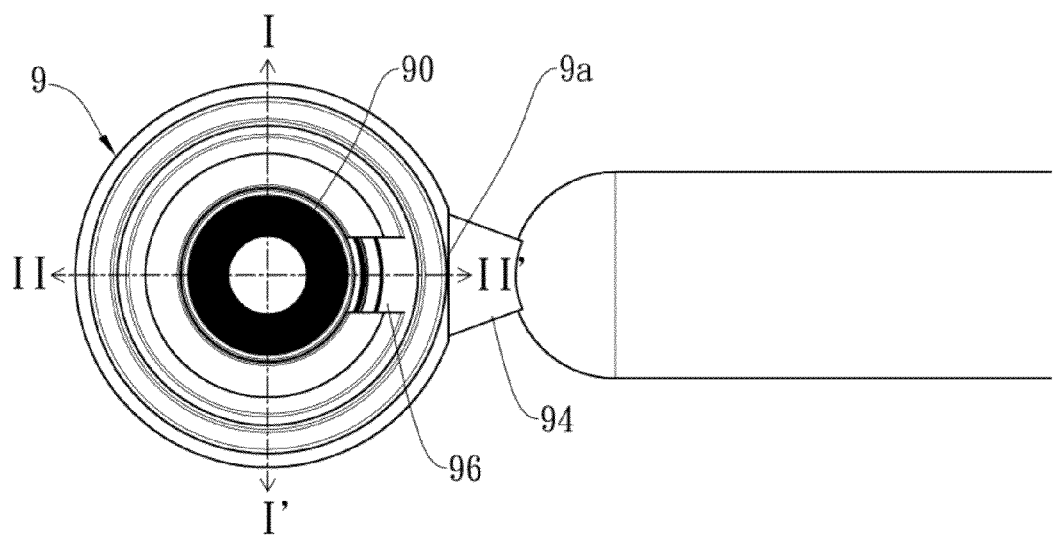
FIGS. 9A-9D illustrates a plastic optical lens in accordance with a fifth embodiment of the present invention.
Figure 9B:
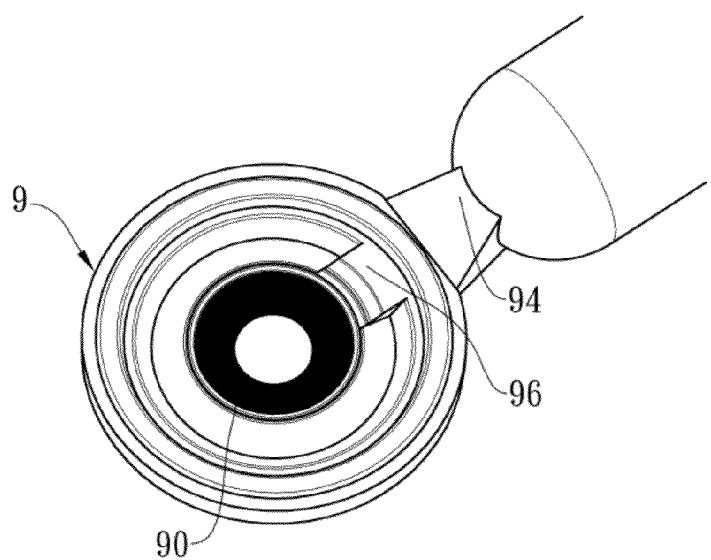
Figure 9C:
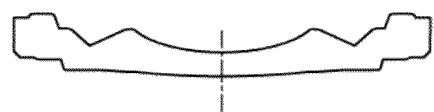
Figure 9D:
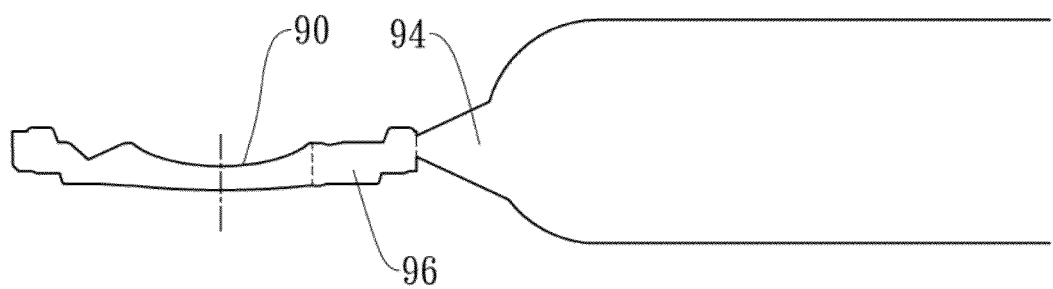
Figure 10A:
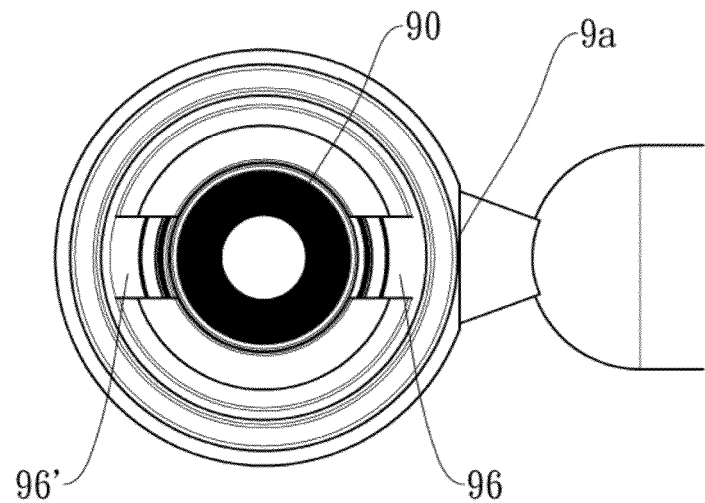
FIGS. 10A-10D illustrates alternative examples of the plastic optical lens in accordance with the fifth embodiment of the present invention.
Figure 10B:
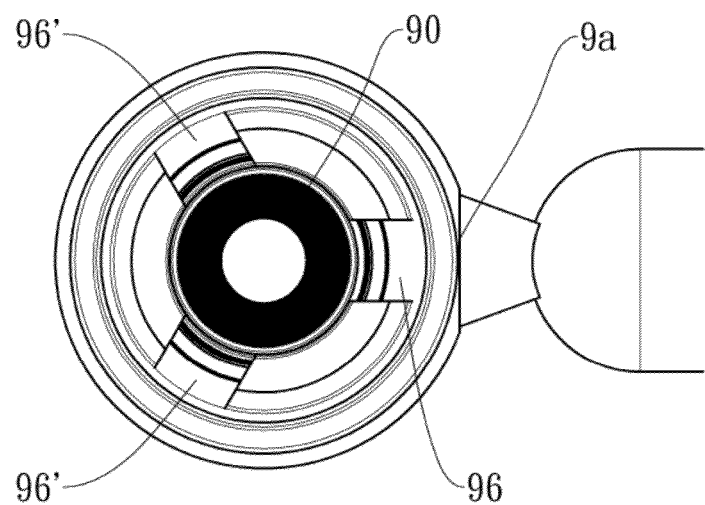
Figure 10C:
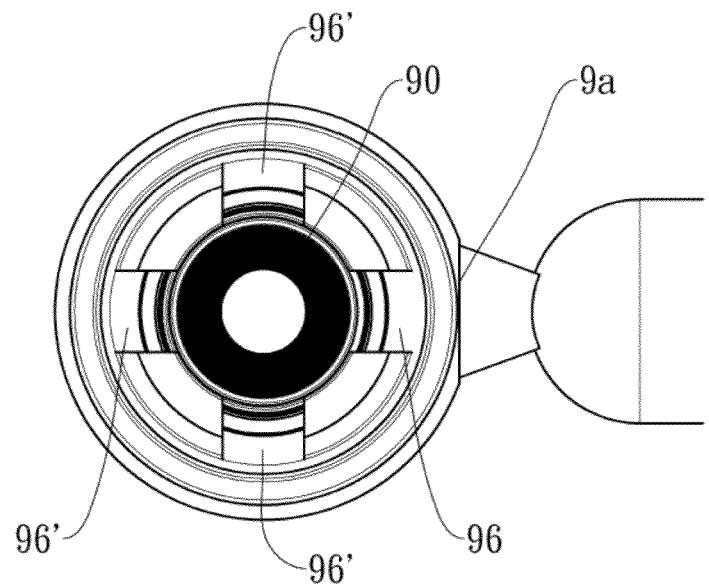
Figure 10D:
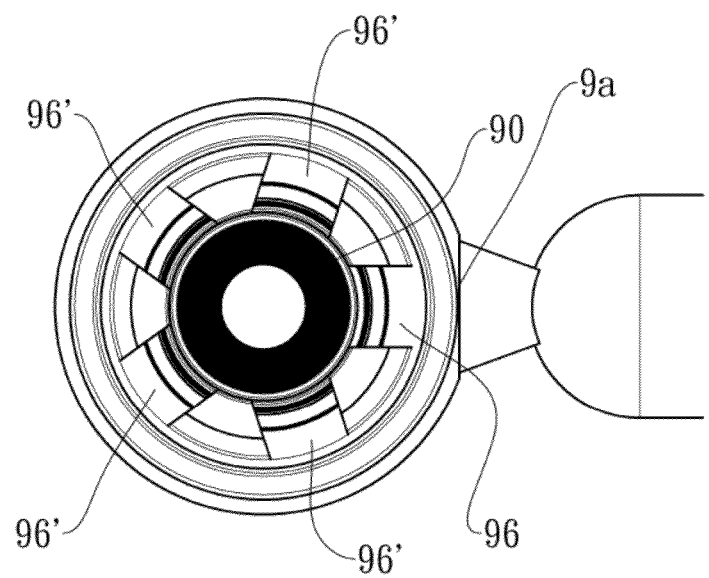
Figure 11A:
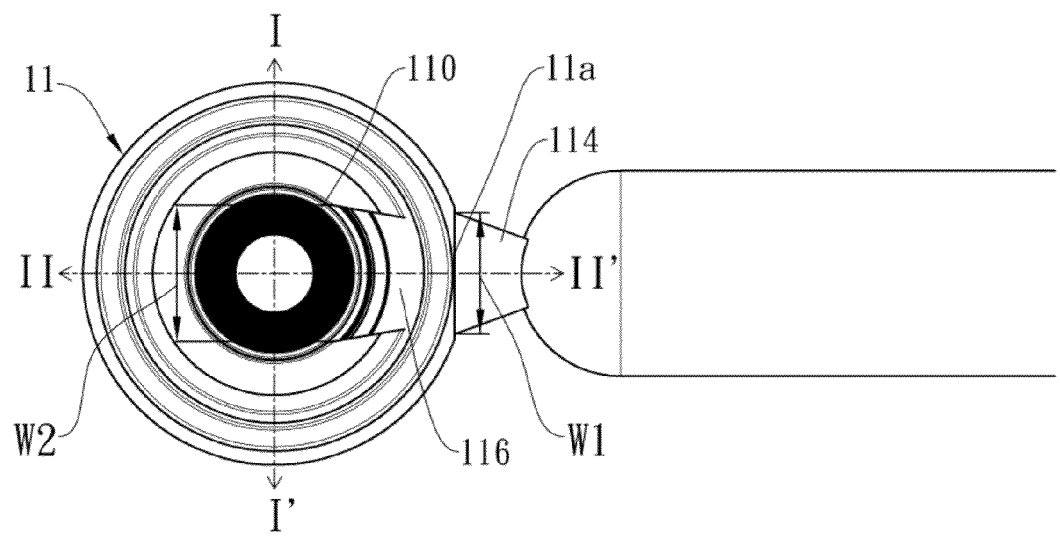
FIGS. 11A-11D illustrates a plastic optical lens in accordance with a sixth embodiment of the present invention.
Figure 11B:
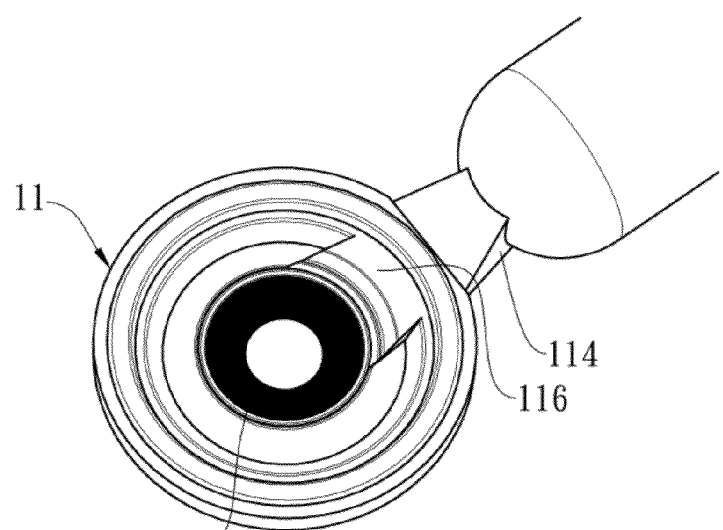
Figure 11C:
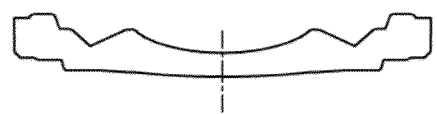
Figure 11D:
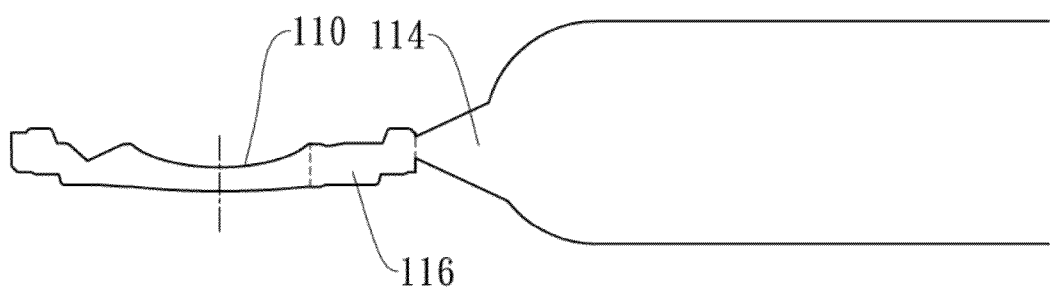
Figure 12A:
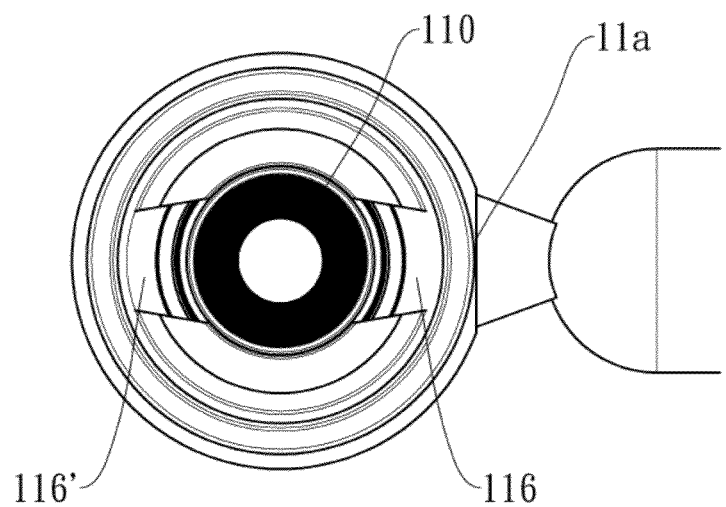
FIGS. 12A-12D illustrates alternative examples of the plastic optical lens in accordance with the sixth embodiment of the present invention.
Figure 12B:
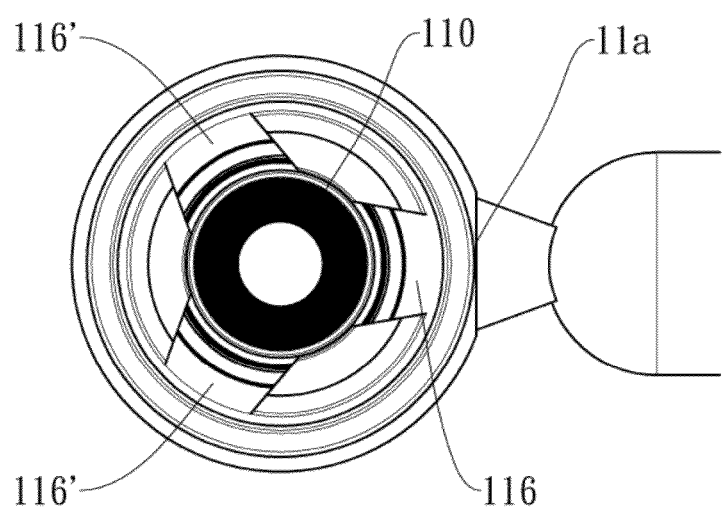
Figure 12C:
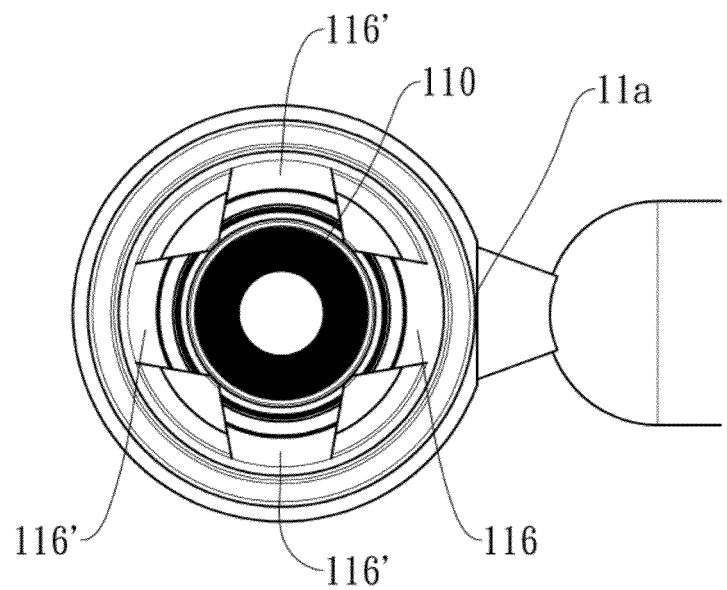
Figure 12D:
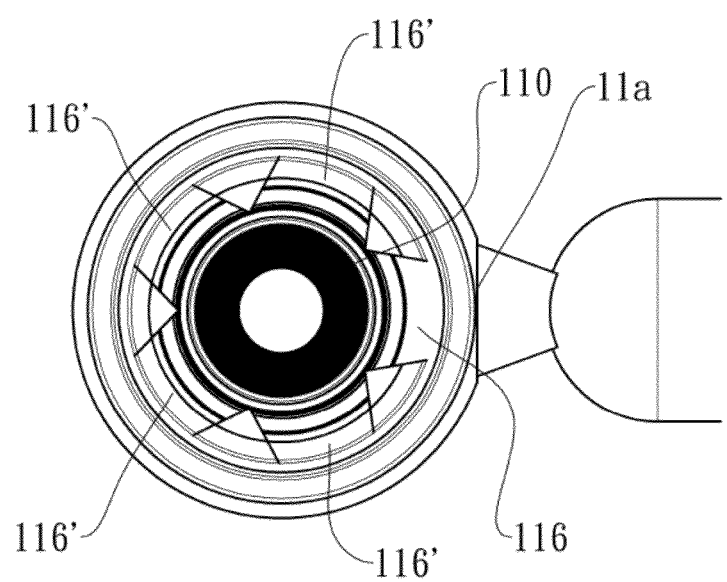
Figure 13A:
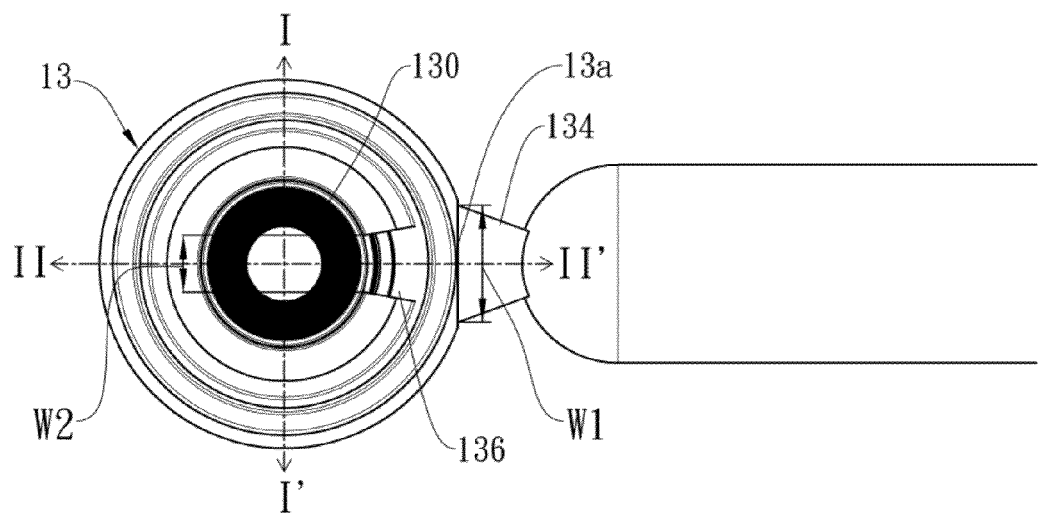
FIGS. 13A-13D illustrates a plastic optical lens in accordance with a seventh embodiment of the present invention.
Figure 13B:
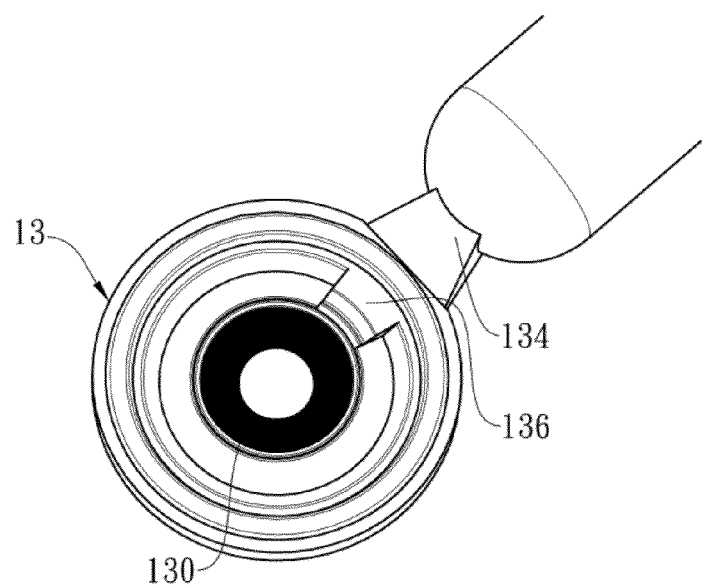
Figure 13C:
Figure 13D:
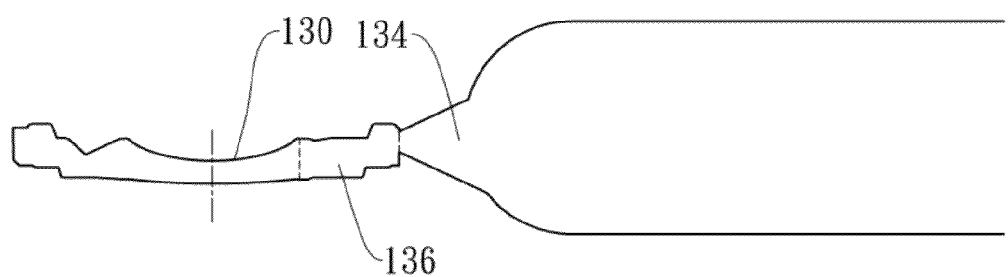
Figure 14A:
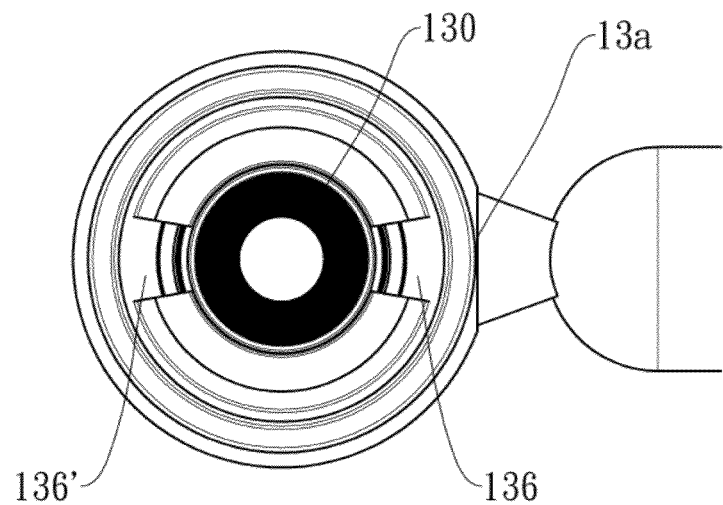
FIGS. 14A-14D illustrates alternative examples of the plastic optical lens in accordance with the seventh embodiment of the present invention.
Figure 14B:
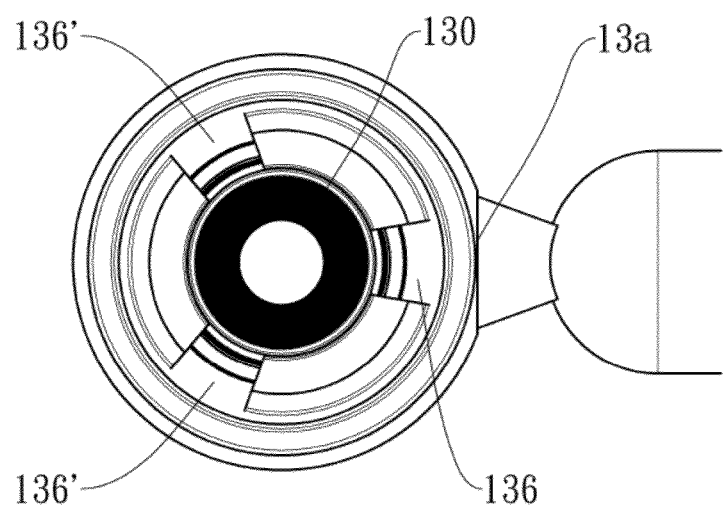
Figure 14C:
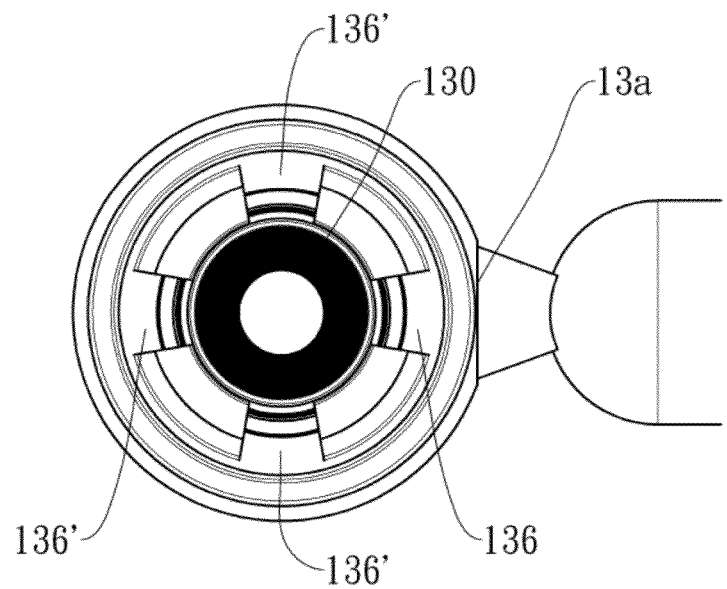
Figure 14D:
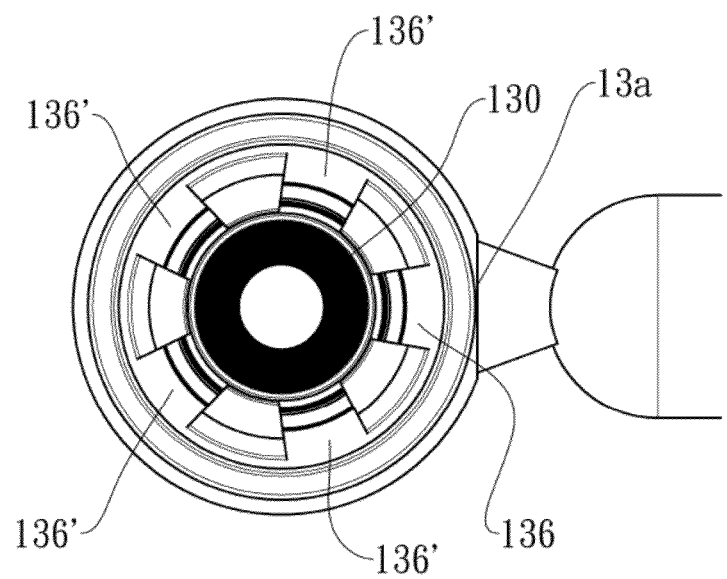
Figure 15A:
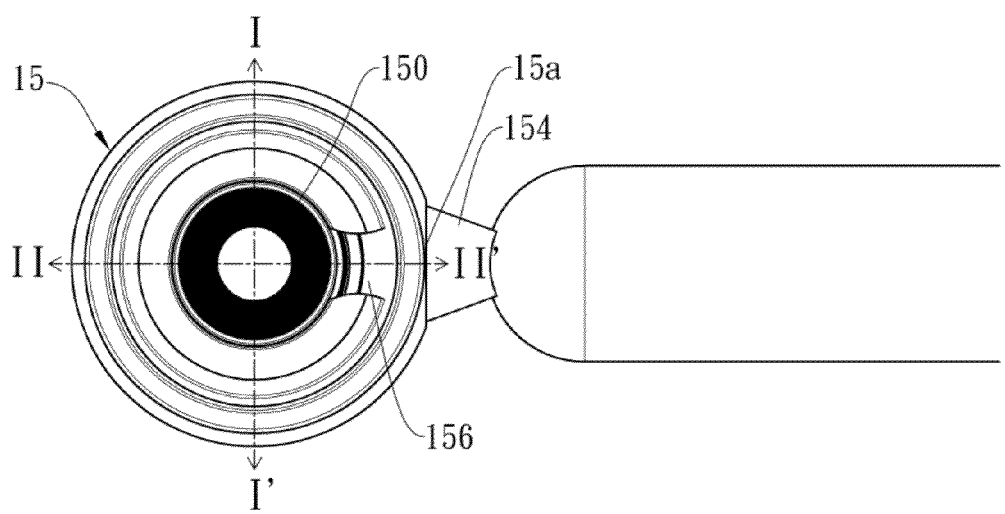
FIGS. 15A-15D illustrates a plastic optical lens in accordance with an eighth embodiment of the present invention.
Figure 15B:
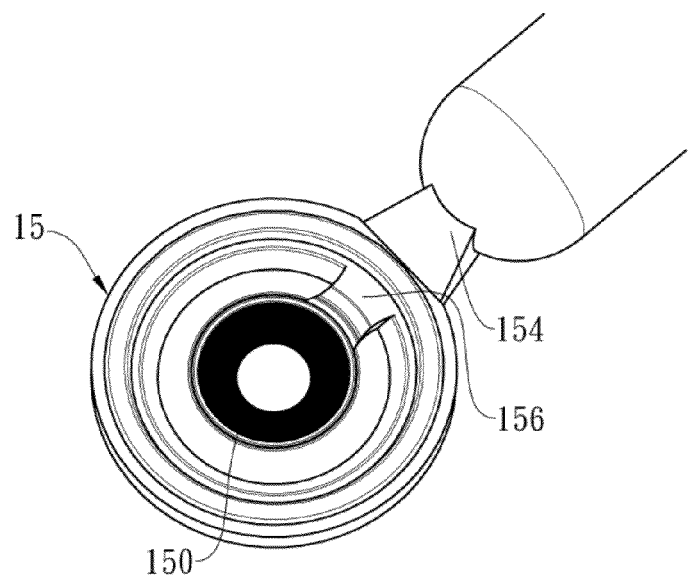
Figure 15C:
Figure 15D:
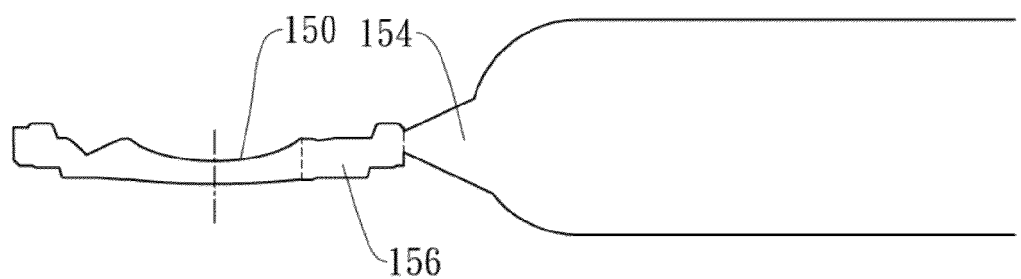
Figure 16A:
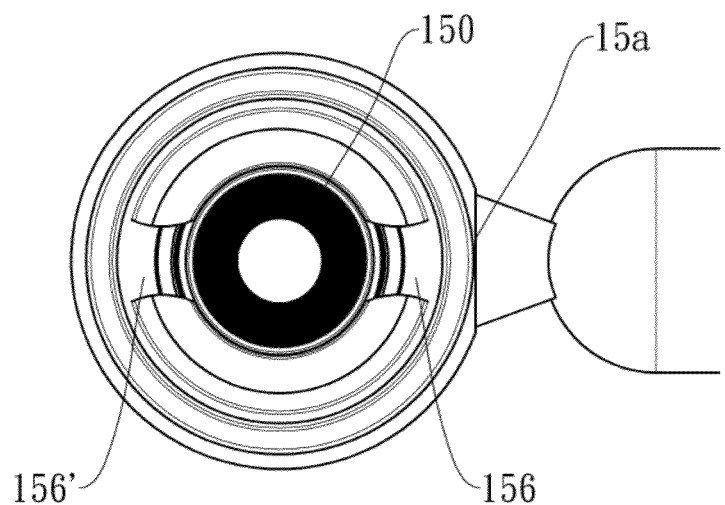
FIGS. 16A-16D illustrates alternative examples of the plastic optical lens in accordance with the eighth embodiment of the present invention.
Figure 16B:
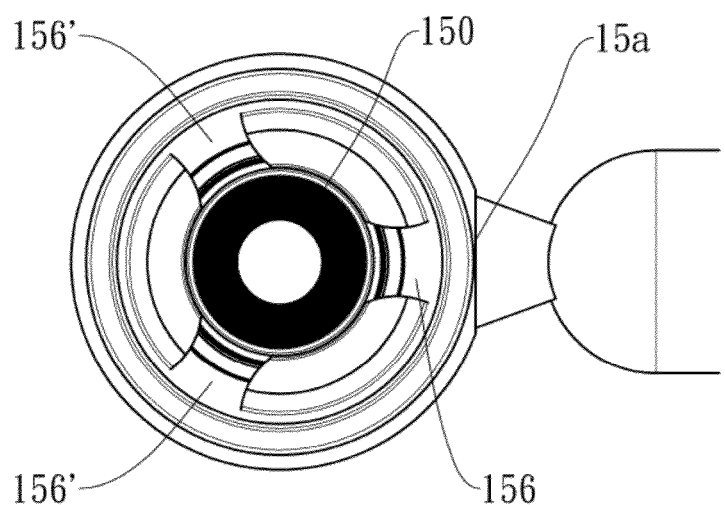
Figure 16C:
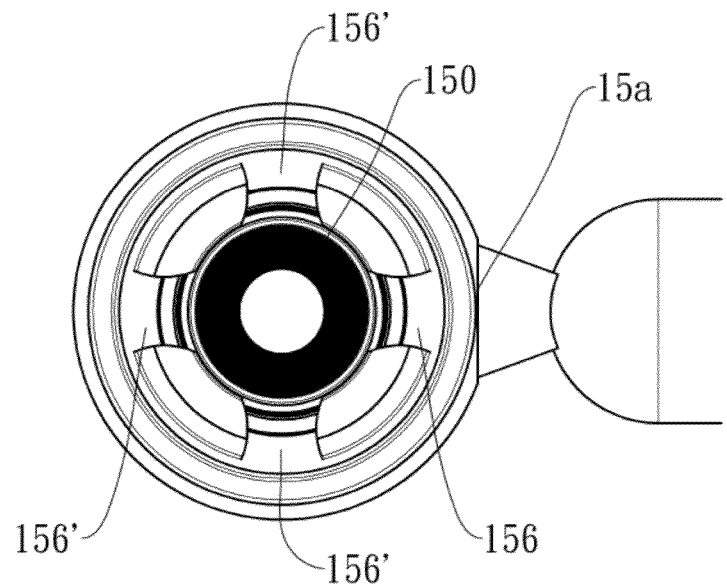
Figure 16D:
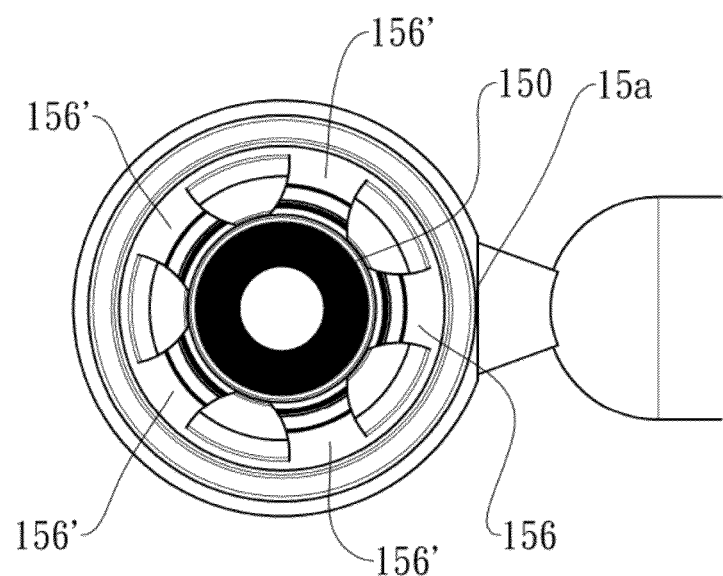
Figure 17A:
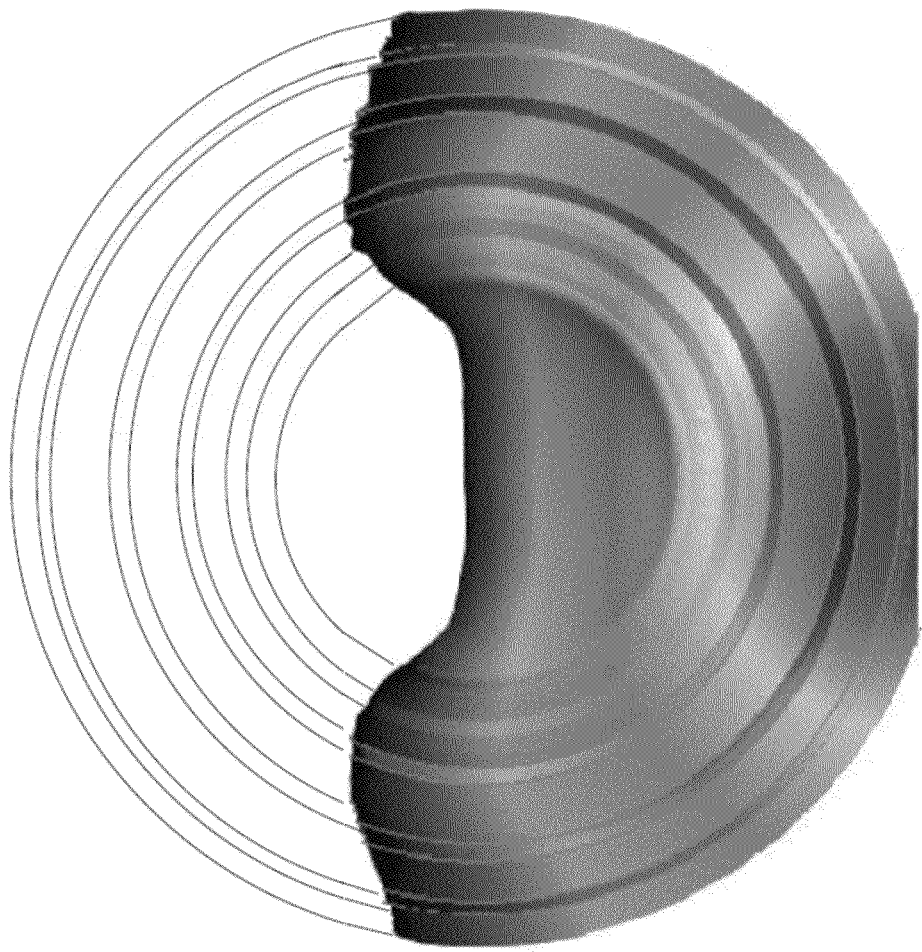
FIGS. 17A and 17B illustrate the flow of the molten plastics into the lens mold during the plastic lens molding process in which the conventional injection-molding method is applied.
Figure 17B:
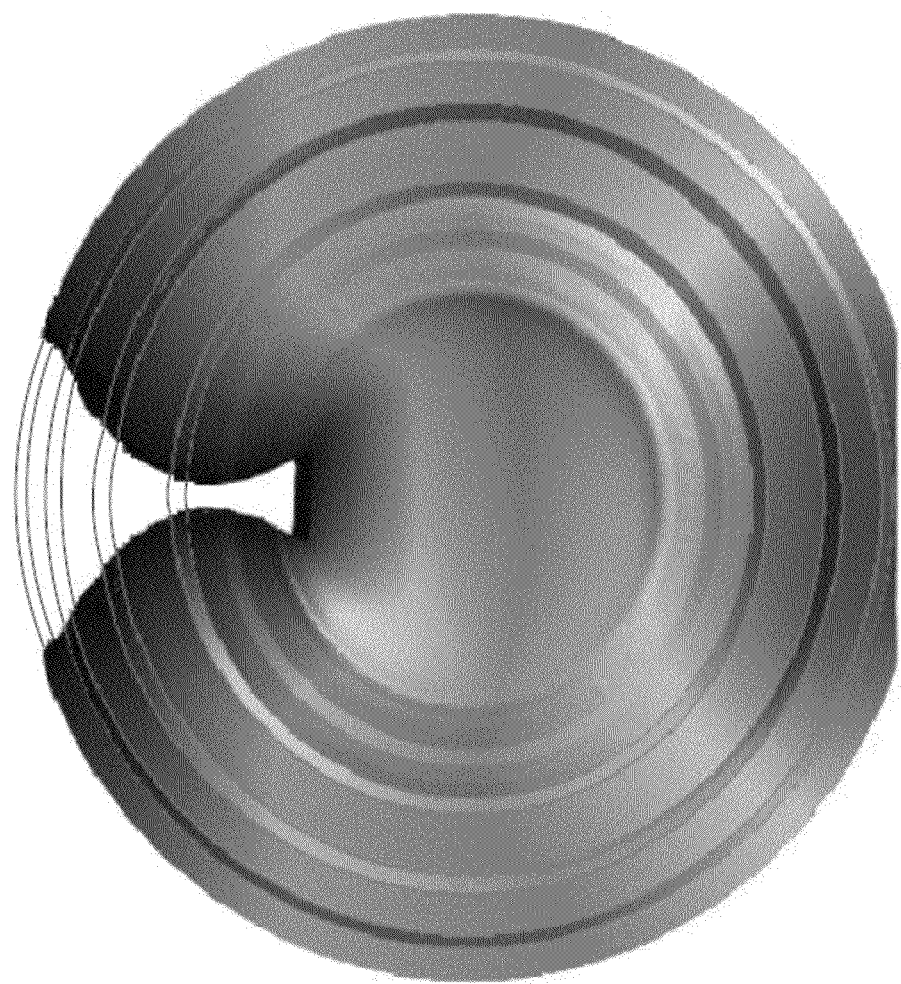

FIGS. 1A-1D are a top view, a perspective view and two sectional views, respectively, of a plastic optical lens in accordance with a first embodiment of the present invention. In the first embodiment of the present invention, a plastic optical lens 1 comprises an optical effective diameter region 10 and a plurality of annular curve portions 12 surrounding an optical axis of the plastic optical lens 1 and formed outside the optical effective diameter region 10. A region where a portion of an outer periphery of the plastic optical lens 1 is connected to a side sprue gate 14 is defined as a sprue gate plane 1a, and an inlet protrusion 16 is arranged between the optical effective diameter region 10 and the sprue gate plane 1a. As shown in FIGS. 1B and 1D, the inlet protrusion 16 is of a rib-like shape so that a height of at least one portion other than the portion defined by a width of the sprue gate plane 1a of a cross-section of any annular curve region 12 within the inlet protrusion 16 arranged between the optical effective diameter region 10 and the sprue gate plane 1a is smaller than an average height of the portion defined by the width of the sprue gate plane 1a. Moreover, the other end of the side sprue gate 14 is connected to a runner 18. During the lens molding process, the molten plastic is injected to the mold through the runner 18 to form the plastic optical lens 1.

Figure 18:
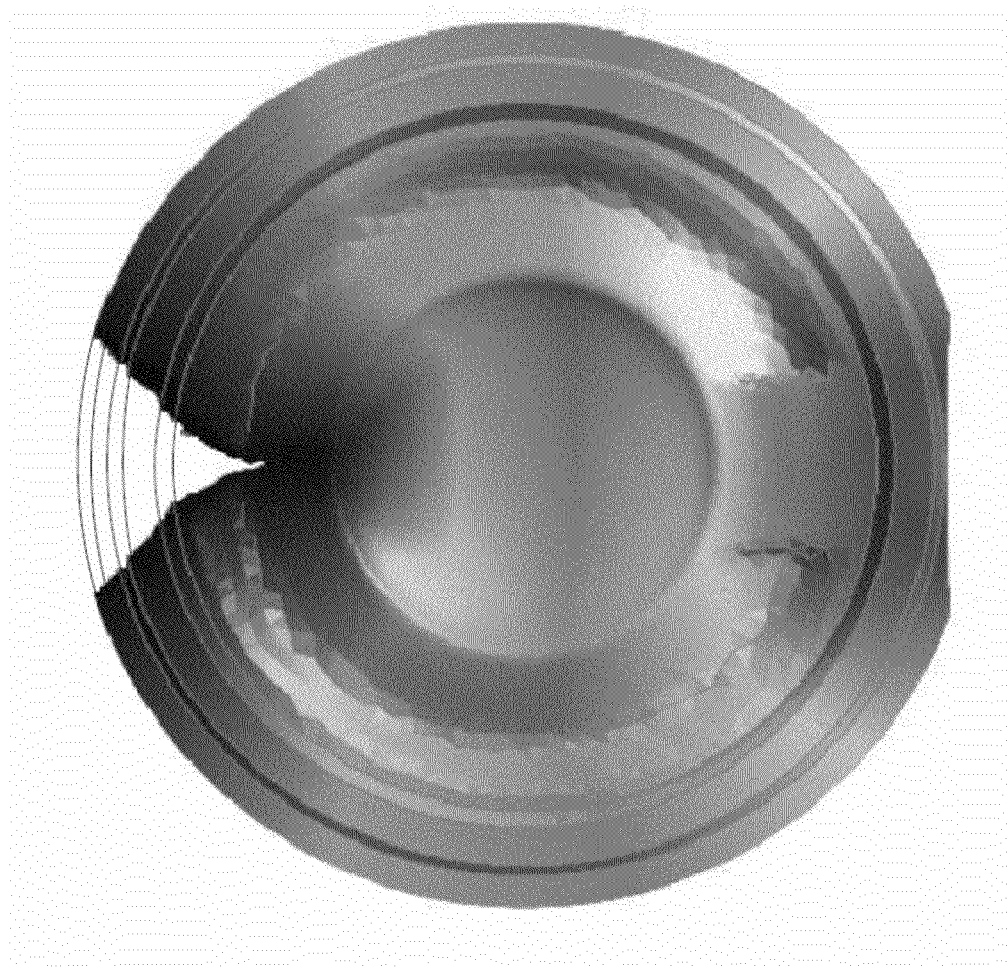
FIG. 18 illustrates the flow of the molten plastics into the lens mold during the molding process of the plastic optical lens in accordance with the first embodiment of the present invention.

FIGS. 1C and 1D are sectional views taken respectively along lines I-I' and II-II' in FIG. 1A. As can be seen from FIG. 1D, an average height of the inlet protrusion 16 between the optical effective diameter region 10 and the sprue gate plane 1a is greater than a height of at least one portion other than the portion defined by the inlet protrusion 16 of the plastic optical lens 1 so that the inlet protrusion 16 has a larger cross-sectional area of the plastic optical lens 1. That is, the cross-sectional area of the rib-shaped inlet protrusion 16 provides a shortcut that facilitates the molten plastics to flow through the optical effective diameter region of the lens as early as possible during the lens molding process, thereby the optical effective diameter region can be filled effectively to avoid the formation of a void or a welding line. In other words, a mold (not shown) having an inlet channel is adopted in the injection-molding process of the plastic optical lens 1 of the present invention. The inlet channel is arranged between regions of the mold corresponding to the optical effective diameter region 10 and the sprue gate plane 1a. That is, the inlet channel corresponds to the inlet protrusion 16 of the plastic optical lens 1. With the arrangement of the inlet channel, the path between the optical effective diameter region 10 and the sprue gate 14 is larger than other areas during the molding process of the plastic optical lens 1 so as to reduce the resistance that hinders the flow of the molten plastics to the optical effective diameter region 10 from the sprue gate 14 through the runner 18. Accordingly, the molten plastics can pass through a region of the mold corresponding to the optical effective diameter region 10 of the plastic optical lens 1 earlier than through the peripheral parts of the mold during the molding process, thereby avoiding the formation of a void or a welding line in the optical effective diameter region 10, as shown in FIG. 18. Consequently, the production yield for the plastic optical lens 1 can be increased and the thickness of the lens can be reduced.

FIGS. 2A-2D are top views of alternative examples of the first embodiment of the present invention. Each of the plastic optical lenses 1 shown in FIGS. 2A-2D is provided with at least one protrusion 16' whose configuration is the same as that of the inlet protrusion 16. Moreover, the at least one protrusion 16' and the inlet protrusion 16 are symmetrically disposed outside the optical effective diameter region 10. Except for the arrangement of the at least one protrusion 16', the rest of the structures of each of the plastic optical lenses shown in FIGS. 2A-2D are the same as the corresponding structures of the plastic optical lens 1 in the first embodiment of the present invention.

FIGS. 3A-3D are a top view, a perspective view and two sectional views taken respectively along lines I-I' and II-II' of a plastic optical lens in accordance with a second embodiment of the present invention. In the second embodiment, the present invention provides a plastic optical lens 3 comprising an inlet protrusion 36 arranged between an optical effective diameter region 30 thereof and a side sprue gate 34, and a region where a portion of an outer periphery of the plastic optical lens 3 is connected to the sprue gate 34 is defined as a sprue gate plane 3a having a width W1 smaller than at least one width W2 of the inlet protrusion 36.

FIGS. 4A-4D are top views of alternative examples of the second embodiment of the present invention. Each of the plastic optical lenses 3 shown in FIGS. 4A-4D is provided with at least one protrusion 36' whose configuration is the same as that of the inlet protrusion 36. Moreover, the at least one protrusion 36' and the inlet protrusion 36 are symmetrically disposed outside the optical effective diameter region 30. Except for the arrangement of the at least one protrusion 36', the rest of the structures of each of the plastic optical lenses shown in FIGS. 4A-4D are the same as the corresponding structures of the plastic optical lens 3 in the second embodiment of the present invention.

FIGS. 5A-5D are a top view, a perspective view and two sectional views taken respectively along lines I-I' and II-II' of a plastic optical lens in accordance with a third embodiment of the present invention. In the third embodiment, the present invention provides a plastic optical lens 5 comprising an inlet protrusion 56 arranged between an optical effective diameter region 50 thereof and a side sprue gate 54, and a region where a portion of an outer periphery of the plastic optical lens 5 is connected to the sprue gate 54 is defined as a sprue gate plane 5a having a width W1 larger than at least one width W2 of the inlet protrusion 56.

FIGS. 6A-6D are top views of alternative examples of the third embodiment of the present invention. Each of the plastic optical lenses 5 shown in FIGS. 6A-6D is provided with at least one protrusion 56' whose configuration is the same as that of the protrusion 56. Moreover, the at least one protrusion 56' and the protrusion 56 are symmetrically disposed outside the optical effective diameter region 50. Except for the arrangement of the at least one protrusion 56', the rest of the structures of each of the plastic optical lenses shown in FIGS. 6A-6D are the same as the corresponding structures of the plastic optical lens 5 in the third embodiment of the present invention.

FIGS. 7A-7D are a top view, a perspective view and two sectional views taken respectively along lines I-I' and line II-II' of a plastic optical lens in accordance with a fourth embodiment of the present invention. In the fourth embodiment, the present invention provides a plastic optical lens 7 comprising an inlet protrusion 76 arranged between an optical effective diameter region 70 thereof and a side sprue gate 74, and a region where a portion of an outer periphery of the plastic optical lens 7 is connected to the sprue gate 74 is defined as a sprue gate plane 7a. The inlet protrusion 76 has two arc-shaped sides perpendicular to a width direction thereof. Except for the arrangement of the two arc-shaped sides, the rest of the structures of the plastic optical lens 7 in the fourth embodiment are the same as the corresponding structures of the plastic optical lens 1 in the first embodiment.

FIGS. 8A-8D are top views of alternative examples of the fourth embodiment of the present invention. Each of the plastic optical lenses 7 shown in FIGS. 8A-8D is provided with at least one protrusion 76' whose configuration is the same as that of the inlet protrusion 76. Moreover, the at least one protrusion 76' and the inlet protrusion 76 are symmetrically disposed outside the optical effective diameter region 70. Except for the arrangement of the at least one protrusion 76', the rest of the structures of each of the plastic optical lenses shown in FIGS. 8A-8D are the same as the corresponding structures of the plastic optical lens 7 in the fourth embodiment of the present invention.

FIGS. 9A-9D are a top view, a perspective view and two sectional views taken respectively along lines I-I' and II-II' of a plastic optical lens in accordance with a fifth embodiment of the present invention. In the fifth embodiment, the present invention provides a plastic optical lens 9 comprising an inlet protrusion 96 arranged between an optical effective diameter region 90 thereof and a fan-shaped side sprue gate 94, and a region where a portion of an outer periphery of the plastic optical lens 9 is connected to the sprue gate 94 is defined as a sprue gate plane 9a. The plastic optical lens 9 in the fifth embodiment and the plastic optical lens 1 in the first embodiment are the same except that the side sprue gate 94 is of a fan shape.

FIGS. 10A-10D are top views of alternative examples of the fifth embodiment of the present invention. Each of the plastic optical lenses 9 shown in FIGS. 10A-10D is provided with at least one protrusion 96' whose configuration is the same as that of the inlet protrusion 96. Moreover, the at least one protrusion 96' and the inlet protrusion 96 are symmetrically disposed outside the optical effective diameter region 90. Except for the arrangement of the at least one protrusion 96', the rest of the structures of each of the plastic optical lenses shown in FIGS. 10A-10D are the same as the corresponding structures of the plastic optical lens 9 in the fifth embodiment of the present invention.

FIGS. 11A-11D are a top view, a perspective view and two sectional views taken respectively along lines I-I' and II-II' of a plastic optical lens in accordance with a sixth embodiment of the present invention. In the sixth embodiment, the present invention provides a plastic optical lens 11 comprising an inlet protrusion 116 arranged between an optical effective diameter region 110 thereof and a fan-shaped side sprue gate 114, and a region where a portion of an outer periphery of the plastic optical lens 11 is connected to the fan-shaped sprue gate 114 is defined as a sprue gate plane 11a. The fan-shaped sprue gate plane 11a has a width W1 smaller than at least one width W2 of the inlet protrusion 116.

FIGS. 12A-12D are top views of alternative examples of the sixth embodiment of the present invention. Each of the plastic optical lenses 11 shown in FIGS. 12A-12D is provided with at least one outlet protrusion 116' whose configuration is the same as that of the inlet protrusion 116. Moreover, the at least one outlet protrusion 116' and the inlet protrusion 116 are symmetrically disposed outside the optical effective diameter region 110. Except for the arrangement of the at least one outlet protrusion 116', the rest of the structures of each of the plastic optical lenses shown in FIGS. 12A-12D are the same as the corresponding structures of the plastic optical lens 11 in the sixth embodiment of the present invention.

FIGS. 13A-13D are a top view, a perspective view and two sectional views taken respectively along lines I-I' and II-II' of a plastic optical lens in accordance with a seventh embodiment of the present invention. In the seventh embodiment, the present invention provides a plastic optical lens 13 comprising an inlet protrusion 136 arranged between an optical effective diameter region 130 thereof and a fan-shaped side sprue gate 134, and a region where a portion of an outer periphery of the plastic optical lens 13 is connected to the fan-shaped sprue gate 134 is defined as a sprue gate plane 13a having a width W1 greater than at least one width W2 of the inlet protrusion 136.

FIGS. 14A-14D are top views of alternative examples of the seventh embodiment of the present invention. Each of the plastic optical lenses 13 shown in FIGS. 14A-14D is provided with at least one protrusion 136' whose configuration is the same as that of the inlet protrusion 136. Moreover, the at least one protrusion 136' and the inlet protrusion 136 are symmetrically disposed outside the optical effective diameter region 130. Except for the arrangement of the at least one protrusion 136', the rest of the structures of each of the plastic optical lenses shown in FIGS. 14A-14D are the same as the corresponding structures of the plastic optical lens 13 in the seventh embodiment.

FIGS. 15A-15D are a top view, a perspective view and two sectional views taken respectively along lines I-I' and II-II of a plastic optical lens in accordance with an eighth embodiment of the present invention. In the eighth embodiment, the present invention provides a plastic optical lens 15 comprising an inlet protrusion 156 arranged between an optical effective diameter region 150 thereof and a fan-shaped side sprue gate 154, and a region where a portion of an outer periphery of the plastic optical lens 15 is connected to the fan-shaped sprue gate 154 is defined as a sprue gate plane 15a. The inlet protrusion 156 has two arc-shaped sides perpendicular to a width direction thereof. Except for the arrangement of the two arc-shaped sides, the rest of the structures of the plastic optical lens 15 in the eighth embodiment are the same as the corresponding structures of the plastic optical lens 9 in the fifth embodiment.

FIGS. 16A-16D are top views of alternative examples of the eighth embodiment of the present invention. Each of the plastic optical lenses 15 shown in FIGS. 16A-16D is provided with at least one protrusion 156' whose configuration is the same as that of the inlet protrusion 156. Moreover, the at least one protrusion 156' and the inlet protrusion 156 are symmetrically disposed outside the optical effective diameter region 150. Except for the arrangement of the at least one protrusion 156', the rest of the structures of each of the plastic optical lenses shown in FIGS. 16A-16D are the same as the corresponding structures of the plastic optical lens 15 in the eighth embodiment.

It is to be understood that the present invention is not limited by the aforementioned embodiments. Various changes or alterations having the same effect and made without departing from the spirit of the present invention shall fall within the scope of the appended claims.

What is claimed is:

1. A plastic optical lens formed by an injection-molding method and comprising:

a sprue gate plane formed on an outer periphery of the plastic optical lens and parallel to an optical axis thereof, wherein when viewing from the optical axis, the sprue gate plane is a chord of the outer periphery of the plastic optical lens; and wherein a height of at least one portion other than a portion defined within a width of the sprue gate plane of any annular cross-section centering the optical axis between an optical effective diameter region of the plastic optical lens and the sprue gate plane is smaller than an average height of the portion defined within the width of the sprue gate plane.

2. The plastic optical lens according to claim 1 comprising an inlet protrusion arranged between the optical effective diameter region and the sprue gate plane, wherein a width of the sprue gate plane can be greater or smaller than a width of the inlet protrusion.

3. The plastic optical lens according to claim 2 further comprising at least one protrusion whose configuration is the same as that of the inlet protrusion, wherein the at least one protrusion and the inlet protrusion are symmetrically disposed around the optical axis outside the optical effective diameter region.

4. The plastic optical lens according to claim 2, wherein the inlet protrusion has at least one non-linear side perpendicular to a width direction thereof.

5. The plastic optical lens according to claim 2, wherein the width of the inlet is increasing gradually from the sprue gate plane in a direction toward the optical effective diameter region.

6. The plastic optical lens according to claim 5 further comprising at least one protrusion whose configuration is the same as that of the inlet protrusion, wherein the at least one protrusion and the inlet protrusion are symmetrically disposed around the optical axis outside the optical effective diameter region.

7. The plastic optical lens according to claim 5, wherein the inlet protrusion has at least one non-linear side perpendicular to the width direction thereof.

8. An injection-molding method for a plastic optical lens comprising:
 using a mold comprising an inlet channel arranged between an optical effective diameter region and a sprue gate plane,
 wherein the sprue gate plane is formed on an outer periphery of the mold and parallel to an optical axis thereof, and configured to be connected with a sprue gate;
 wherein when viewing from the optical axis, the sprue gate plane is a chord of the outer periphery of the mold; and
 wherein an average height of the inlet channel is greater than a height of at least one portion other than a portion defined within the inlet channel of any annular cross-section centering an optical axis.

9. The injection-molding method for a plastic optical lens according to claim 8, wherein the mold comprises at least one channel region whose configuration is the same as that of the inlet channel, wherein the at least one channel region and the inlet channel are symmetrically disposed around the optical axis outside the optical effective diameter region.

\* \* \* \* \*